Patented Sept. 13, 1949

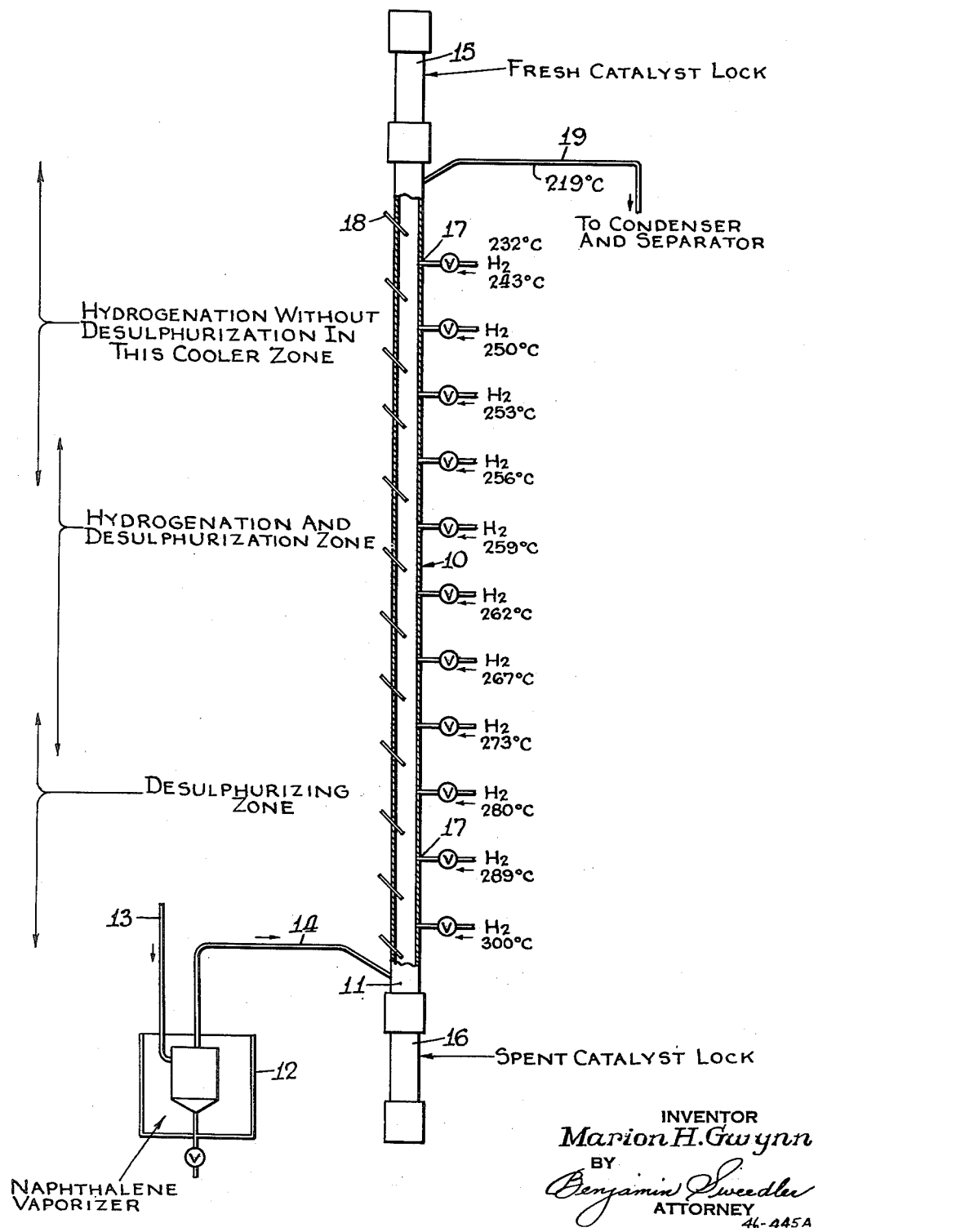

2,481,921

UNITED STATES PATENT OFFICE 2,481,921

CATALYTIC HYDROGENATION OF NAPHTHALENES

Marion H. Gwynn, Mountain Lakes, N. J., assignor to Allied Chemical & Dye Corporation, New York, N. Y., a corporation of New York Application December 18, 1946, Serial No. 717,063

10 Claims. (Cl. 260—66.7)

This invention relates to the hydrogenation of crude naphthalenes to produce tetrahydronaphthalenes, decahydronaphthalenes, or mixtures thereof. The invention is applicable not only to the hydrogenation of crude naphthalene but also to hydrogenation of homologs thereof, particularly methyl and dimethyl substituted naphthalenes. Accordingly, the expression "naphthalenes" is used herein in a broad sense and is intended to include not only naphthalene but also such homologs. By "crude naphthalenes" is meant commercial grades of naphthalenes, which contain sulfur compounds including thionaphthenes, the amount of sulfur in such crudes usually being within the range of from 0.02 to 0.3 percent by weight.

In the catalytic hydrogenation of naphthalene, as heretofore carried out, a naphthalene starting material of an exceptionally high degree of purity was employed. The use of commercial naphthalene, which, as above indicated, contains sulfur compounds, was found to result in extremely rapid poisoning of the catalyst. Even the relatively pure commercially produced naphthalenes which, for example, had been purified by treatment with sulfuric acid, contain small amounts of impurities which tend to poison the catalyst. For example, the use of commercially refined naphthalene having a melting point of 80° C., and containing 0.12% to 0.17% sulfur, causes rapid catalyst poisoning during hydrogenation.

Purification of naphthalene by treatment with finely divided porous materials, such as infusorial earth, fuller's earth, metal oxides or organic solvents, does not result in the production of a refined naphthalene which can be satisfactorily hydrogenated by passage in the vapor phase over a sulfur sensitive catalyst such as a nickel catalyst, unless a prolonged refining treatment is employed, rendering such treatment uneconomical. Another refining treatment which has received considerable attention is to treat the naphthalene in molten state with a small amount of metallic sodium; this treatment is expensive and involves the known hazards necessarily entailed in the use of sodium.

Sulfur immune catalysts such as molybdenum sulfide have been suggested for use as catalysts in the hydrogenation of crude naphthalene. Such catalysts, however, are operative usually in liquid phase hydrogenations at temperatures of the order of 400° C. and at a pressure of the order of 100 to 300 atmospheres. The use of such high temperatures and pressures increases the expense of operation; also, large amounts of undesired by-products are formed.

Among the objects of this invention are to provide a process for hydrogenating crude naphthalenes by passage in the vapor phase over a sulfur sensitive catalyst in which process the crude naphthalenes are used, without subjecting them to a preliminary refining treatment, and which process results in satisfactory yields of tetrahydronaphthalenes or decahydronaphthalenes, or mixtures thereof, as may be desired.

Another object is to provide such process which can be economically carried out under relatively low superatmospheric pressures and temperatures. Other objects and advantages of this invention will be apparent from the following description thereof.

According to the present discovery, crude naphthalene is hydrogenated by passage in the vapor phase admixed with hydrogen over a sulfur sensitive nickel or cobalt hydrogenation catalyst under the following conditions:

(1) Maintaining in the reaction zone an absolute pressure of from 2 to 60 atmospheres, preferably 4 to 30 atmospheres;

(2) Controlling the temperature so that a temperature within the range of 170° C. to 340° C. is maintained in the reaction zone; preferably and particularly when hydrogenating crude naphthalene having a relatively high sulfur content, the temperature at the inlet portion of the reaction zone is maintained within the range of from 250° to 330° C., and the temperature at the exist portion is maintained within the range of 180° to 240° C.;

(3) Utilizing an amount of hydrogen of at least 4 cubic feet of hydrogen, measured at the pressure (P atmospheres) existing in the catalyst zone and at room temperature, per pound of naphthalene vaporized and fed through the catalyst zone; this amount represents an excess over the stoichiometric amount required to produce the tetrahydronaphthalene of at least (P—1) times this stoichiometric amount;

(4) Employing a sulfur sensitive high concentration nickel or cobalt catalyst, viz. a nickel or cobalt catalyst, having a concentration of from 1 to 10 mols, preferably of from 2 to 8 mols of nickel or cobalt, respectively, per liter of reaction space, and arranging the catalyst in the reaction zone so that the inlet naphthalene vapor and hydrogen contacts the less active catalyst, and the reaction products leave the reaction zone at a point where the catalyst is most active, i. e., the catalyst is disposed in an ascending gradient in the direction of the naphthalene vapor hydrogen flow. Preferably, but not necessarily, a descending temperature gradient is maintained throughout the catalyst bed, desirably by introducing hydrogen into the reaction zone at spaced points along the length thereof to effect the desired cooling of the catalyst; and (5) Flowing the naphthalene vapor and hydrogen over the catalyst at a rate such that the apparent time of contact of the reactants with the catalyst is less than 1 minute, preferably within the range of from 1 to 30 seconds.

By following the above conditions, surprisingly it has been found crude naphthalene and homologs thereof can be hydrogenated at high rates to produce tetrahydro or decahydro naphthalenes, or mixtures thereof with (a) unexpectedly low production of undesirable reaction products, (b) substantially complete elimination of sulfur from the desired hydrogenated naphthalene reaction products, and (c) low rates of catalyst deterioration.

The contact time may be defined as the bulk volume of catalyst employed, divided by the volume of gaseous reaction mixture fed per second, measured at the mean catalyst temperature and the working pressure.

One convenient test for determining catalyst concentration is the oxalic acid stoichiometry test given below.

A representative sample of catalyst in the catalytic state, e. g., about 1 gram, is weighed into a 250 ml. Erlynmeyer flask. Oxalic acid solution in large excess, e. g., 3 to 5 mols per mol of metal is added. For example, 50 to 100 ml. oxalic acid solution in a concentration of the order of N/4 to N/2 is pipetted into the flask. The flask is placed on a steam bath or partially immersed in a hot water bath for 1 or 2 days. Two days at 60° C. or 1 day at 85–90° C. is usually sufficient. If evaporation is substantial, distilled water is added.

After the fixed contact, the excess acid is titrated with a standard NaOH or KOH aqueous solution using phenolphthalein as an indicator. The end point is usually sharp. Or the excess acid may be electrometrically titrated.

In addition to the metal absorption titration determination hereinabove described at least two blank determinations are made, in which oxalic acid solution alone is heated and titrated in the same manner as in the absorption test.

The concentration of oxalatable catalyst in moles per liter of reaction space equals $$\frac{\text{(blank titration-absorption titration)}}{\text{grams sold}} \times \frac{\text{Normality of alkali}}{2} \times \text{Bulk density of catalyst}$$

The bulk density is determined by dividing the mass of the catalyst particles by the total volume occupied by these catalyst particles including interstices between the particles.

The above test assumes no aggregation change during the oxalic acid contact and no reaction with the acid other than neutralization of the catalytic components. A test is discarded when catalyst granules or gross particles break during the acid contact.

Promoted or unpromoted nickel or nickel oxide may be employed as the catalyst in carrying out the process of this invention. For example, catalyst produced by treating pumice, kieselguhr or other support with nickel nitrate solution and decomposing the nitrate to form catalytically active nickel or nickel oxide may be used. Hydrated or basic nickel carbonate may be pelleted, preferably admixed with a pumice or kieselguhr support and using a graphite lubricant and oxidized to produce a black nickel oxide. Spent nickel hydrogenation catalysts reactivated by heating in air or otherwise are suitable. Cobalt catalysts produced as hereinabove described in connection with the nickel catalysts may also be used. It will be understood that in all cases the catalyst used should have a concentration of nickel or cobalt falling within the range of 1 to 10 mols per liter of reaction space.

Hydrogenation is carried out under superatmospheric pressure within the range of 2 to 60 atmospheres; from 6 to 30 atmospheres are preferred in the hydrogenation of naphthalene; 5 to 20 atmospheres for the hydrogenation of methyl naphthalenes; and from about 4 to 15 atmospheres for the hydrogenation of dimethyl naphthalenes.

In order to obtain a reaction product consisting chiefly of the tetrahydro product, the temperature conditions should be within the range of 170° C. to 320° C., preferably from 250° to 320° C. at the inlet end of the reaction zone, and from 170° to 240° C. at the exit end of the reaction zone, pressure within the range of 6 to 15 atmospheres and the amount of hydrogen from 5.5 to 11 cubic feet, measured at the pressure existing in the catalyst zone and at room temperature per pound of naphthalene. On the other hand, if a reaction product preponderating in the decahydro reaction products is desired, then the hydrogenation is carried out at a temperature of from 170° C. to 300° C., preferably within the range of 250° C. to 300° C., at the inlet end of the catalyst zone, and from 170° C. to 220° C. at the exit end, a pressure within the range of 15 to 30 atmospheres and hydrogen in amount of from 4 to 15 cubic feet, measured at the pressure existing in the catalyst zone and at room temperature per pound of naphthalene vaporized and introduced into the reaction zone.

The reaction may advantageously be carried out in apparatus involving one or more catalyst containing reaction tubes or converters arranged in series, which tubes may be maintained at the proper temperature by any suitable means, for example, water under pressure or water steam mixture in jackets surrounding the tubes. The naphthalene is vaporized in a stream of hydrogen which will provide the desired amount of hydrogen per pound of naphthalene vaporized, and the vapor mixture passed over the catalyst in the reaction tubes, the hydrogen being preheated prior to mixing with the naphthalene, so that the vapor mixture is supplied to the catalyst at a temperature within the range of 200° C. to 350° C. The excess hydrogen is separated from the reaction product and may be mixed with additional naphthalene prior to entry of the naphthalene vapors into the reaction chambers, sufficient make-up hydrogen being supplied to provide the desired excess.

As above indicated, the amount of hydrogen circulated through the catalyst should be at least 4, preferably within the range of 4 to 15 cubic feet, measured at the working pressure in the reaction zone at room temperature per pound of naphthalene. The maximum amount of hydrogen which may be used depends upon the equipment employed, i. e., the capacity of the hydrogen supply pump. Desirably, hydrogen is admitted at a plurality of spaced points along the length of the catalyst converter to aid in maintaining desired temperature control throughout the catalyst bed. The excess hydrogen facilitates the control of temperature in the reaction zone in that it absorbs reaction heat and transfers some of the heat to the converter, and also aids in distributing the heat uniformly through the catalyst, resulting in the elimination of hot spots, minimizing undesirable side reactions, and maintaining the naphthalene in the vapor phase, preventing condensation thereof on the catalyst and thereby promoting long catalyst life.

By maintaining a temperature of from 250° C. to 330° C. at the inlet end of the catalyst converter and carrying out the process so that the naphthalene vapor and hydrogen contacts partially spent catalyst, i. e., catalyst which has been rendered selective by sulfiding, sulfur impurities and other potential catalyst poisons are removed from the naphthalene in or near the inlet zone of the catalyst converter. It is important to maintain the temperature in this zone below about 280° C. to 340° C. to prevent the flowing of hydrogen sulfide with the reactant gas stream into the zones of the catalyst converter subsequent to the inlet zone. Operating under the above conditions the catalyst is, in effect, divided into three overlapping zones, in the first of which where the partially spent catalyst is contacted with incoming crude naphthalene vapor, the naphthalene is desulfurized, and catalyst poisons removed; in the second of which residual sulfur impurities are removed and hydrogenation is initiated, and in the last of which the hydrogenation is completed without any desulfurization taking place. In the last zone, the partially hydrogenated naphthalene is contacted with fresh catalyst at a temperature of 220° to 240° C., thereby conserving the catalyst and repressing decahydronaphthalene formation. If it is desired to produce a reaction product containing a high proportion of decahydronaphthalene, the temperature within the last portion of the reaction zone desirably is maintained at 180° C. to 200° C.

In the accompanying drawing is shown diagrammatically one form of apparatus for practicing a process embodying this invention.

In the drawing, 10 indicates a catalyst converter, the inlet end 11 of which communicates with a naphthalene vaporizer 12. A hydrogen line 13 leads into the vaporizer 12, the hydrogen thus introduced mingling with the naphthalene vapor produced in the vaporizer 12, aiding in the vaporization, and the resultant naphthalene vapor hydrogen mixture flowing through line 14 into the inlet end 11 of the catalyst converter 10. The converter 10 is provided with a top lock 15 through which fresh catalyst may be added to the converter and a bottom lock 16 through which spent catalyst may be withdrawn. These locks may be of any conventional type employed to maintain desired superatmospheric pressure conditions in converter 10 while permitting entry and discharge of material to and from the converter.

At spaced points along the length of the converter, a series of hydrogen inlets 17 is provided for the introduction of additional hydrogen to effect the desired temperature control. Pyrometer walls 18 are provided in the sidewall of the converter at spaced points along the length thereof, to indicate temperature conditions within the converter. An exit line 19 is provided at the top of the converter, just below the catalyst lock 15, through which the reactant products in the vapor phase flow to a condenser and separator (not shown) where the hydrogenated naphthalene is condensed and separated from the unreacted hydrogen, the latter being returned to the process if desired.

In initiating the operation of the apparatus shown in the drawing, the catalyst converter 10 may be charged about one-third full with fresh black unreduced nickel oxide catalyst prepared, for example, by mixing hydrated nickel carbonate with a siliceous support and graphite binder, forming the resultant mixture into cylinders or spheres under high pressures, e. g., 300 to 1000 atmospheres. The resultant pellets are then gradually oxidized with air at about 310° C. to blacken and foraminate. The catalysts thus produced should have a concentration of nickel of from 1 to 10 mols per liter of reaction space.

Commercial naphthalene which may contain .05% sulfur or more is pumped to the vaporizer 12, and fed to the reactor at a rate of 1 volume per hour per reaction volume. In the production of tetrahydronaphthalene, the vaporized naphthalene is mixed with 30 to 40 mols of hydrogen per mol of naphthalene, the mixed vapors being preheated to about 210° C. and introduced at 8 atmospheres through the vapor inlet 14 at the bottom of the reactor 10.

Periodic additions of fresh black catalyst are made through the catalyst lock 15, preferably at the rate of one pound of nickel per 360 pounds of naphthalene vaporized. After the reactor has become filled with catalyst, the spent catalyst is discharged at the same rate through the catalyst lock 16.

During the starting-up of the apparatus, the pressure within the reactor is progressively increased to 12 atmospheres, which pressure is maintained during the steady state of operation of the converter. During this starting-up period, the amount of hydrogen admixed with the naphthalene is progressively decreased until the reactor is completely filled with catalyst when about 14 mols of hydrogen per mol of naphthalene is maintained in the gas stream during the subsequent steady state of operation. As the amount of hydrogen is decreased, the temperature to which the mixed naphthalene hydrogen vapors are preheated is progressively increased to about 300° C. When the steady state of operation is reached, the upflowing reaction mixture is progressively cooled by additions of cool hydrogen along the length of the reactor to obtain the temperature conditions noted on the drawing.

The reacted vapors leave the reactor via outlet 19, are cooled to condense-out the hydrogenated products, excess hydrogen being circulated by booster pump and reused. The hydrogenated products will be found sulfur-free and may contain minor quantities of naphthalene and decahydronaphthalene which may be separated by fractional distillation. A portion of the hydrogenated products may be mixed with the liquid naphthalene fed to the vaporizer and recirculated through the reactor.

If decahydronaphthalene is the desired product, the conditions of operations above noted may be changed as follows:

(1) Increase the naphthalene feed rate to approximately 1.3 volumes per hour per reactor volume;

(2) Operate under a pressure of 18 atmospheres in the reactor;

(3) Maintain a temperature gradiant of from

260° C. at the bottom of the reactor to 180° C. at the top of the reactor.

When hydrogenating methyl naphthalenes containing, for example, 0.1% sulfur to produce a tetrahydro product, it is desirable to operate under a pressure of about 10 atmospheres in the reactor, feed of one pound of nickel catalyst through the reactor per 140 pounds of methyl naphthalene, temperature conditions approximately three degrees higher than those indicated on the accompanying drawing and the feed of methyl naphthalene and hydrogen at a somewhat greater rate than hereinabove mentioned in connection with the feed of naphthalene, namely, about 15% greater.

Hydrogenating dimethyl naphthalene containing, for example, 0.15% sulfur to produce a tetrahydro product is preferably carried out under the following conditions:

(1) A temperature gradient of from 305° C. at the inlet end to 230° C. at the exit of the converter; (2) a reactor pressure of about 8 atmosphere; (3) a dimethyl naphthalene feed rate of approximately 1.3 volumes per hour per reactor volume; (4) an amount of hydrogen of approximately 40 mols; and (5) feed of one pound of nickel catalyst through the reactor per 100 pounds of dimethyl naphthalene.

The following examples are illustrative of preferred embodiments of the invention; it will be understood the invention is not limited to these examples.

The catalyst employed in all of the examples hereinbelow described was a nickel catalyst made by pelleting from 70% to 73% basic nickel carbonate with 28% to 25% kieselguhr, and 2% graphite, to produce cylindrical pellets approximately $\frac{3}{16}$" in diameter and $\frac{3}{16}$" long. The basic nickel carbonate was converted to nickel oxide by heating the pellets in a current of air from one to two hours at 300° to 350° C. These pellets had a concentration of approximately 4 mols of nickel per liter of reactor space.

*Example 1*

The catalysts were charged into a catalyst converter consisting of a 1" diameter steel pipe charged with approximately one-half pound of the catalyst, the pipe being immersed in an oil bath maintained at a temperature of 275° to 285° C. Commercial naphthalene melting at 80° C. and containing by analysis 0.12% sulfur was heated above its melting point and pumped at the rate of 1.1 pounds per hour into a heated vaporizer through which hydrogen under a pressure of 150 pounds per square inch was flowing at the rate of 3 cubic feet (measured at room temperature and at the working pressure) per pound of naphthalene. The temperature at the axial center of the catalyst bed ranged from 270° to 325° C.

The gases were passed from the converter through a condenser to a receiver where the excess hydrogen was separated and sent to a storage tank for reuse, the condensate being withdrawn periodically through a discharge valve at the bottom of the receiver. The above hydrogenation was operated about six hours per day for a total of 43 hours. At the start the condensate obtained from the operation contained approximately 10 percent by weight of unconverted naphthalene and 90 percent hydrogenated products consisting principally of tetrahydronaphthalene. Conversions of naphthalene to hydrogenated products dropped progressively after the first five hours of operation and amounted to 35 percent at the end of 43 hours. All of the condensate obtained was sulfur-free. Per cubic foot of catalyst, 4800 pounds of naphthalene were desulfurized, about 3300 pounds of which were converted to tetrahydronaphthalene containing minor proportions of decahydronaphthalene. The reaction products were readily separated by fractional distillation.

*Example 2*

The same naphthalene feed stock was employed as in Example 1, and the same equipment.

A mixture of naphthalene vapor (.6 pound per hour) with hydrogen in the proportions of about 5 cubic feet of hydrogen (measured at room temperature and at the working pressure of 150 pounds per square inch) per pound of naphthalene was heated to about 205° C. and passed through the converter which was charged with about 0.007 cubic feet of catalyst. The converter oil bath temperature was maintained at 205° C. Measured catalyst temperatures varied from 230° to 300° C. in the first half of the catalyst bed and from 230° to 205° C. in the second half. The condensate obtained over several hours of operation had an average composition of about:

| | Per cent |
|---|---|
| Decahydronaphthalene | 75 |
| Tetrahydronaphthalene | 10 |
| Naphthalene | 15 |

*Example 3*

The catalyst converter employed in this example consisted of two jacketed converters 4" in diameter by 6' long, each charged with 25 pounds of catalyst. Oil heated to appropriate temperatures was circulated through the jackets to maintain the temperatures indicated below.

A vapor mixture of 60 pounds per hour of naphthalene and 180 cubic feet of hydrogen (measured at about 40° C. and 175 pounds per square inch pressure) per hour, preheated to about 250° C., was introduced into the first converter in the jacket of which oil was circulated at an average temperature of 275° C. at a rate sufficient to maintain temperatures in the axial center of the catalyst mass between about 250° and about 325° C. The gases emerging from this converter were mixed with additional hydrogen flowing at the rate of about 1500 cubic feet (measured at room temperature and the working pressure) per hour and preheated to about 260° C. This gas mixture was passed through the second converter in which catalyst temperatures were maintained at 260–300° C. by circulating heated oil through the converter jacket. Gases emerging from the second converter were cooled to 40° C., the condensate was separated and removed from the system, and the non-condensable gas, consisting essentially of hydrogen, was recirculated to the hydrogen preheater and back to the vaporizer and converters. Makeup hydrogen in replacement of that consumed in the reaction, was added after the recirculation pump. In the proportions indicated above, the recirculated hydrogen was split into two streams, one being introduced to the vaporizer and the other between the first and second converters.

By periodic sampling of the gases emerging from the first converter, it was found that these were sulfur-free for about the first 50 hours of operation. The condensate from these gases contained about 0.03 percent sulfur after 60 hours and 0.06 percent sulfur and over 90 percent naphthalene after about 72 hours. At this point (72 hours) the first converter was cut out of the system for recharging with fresh catalyst, and operating conditions in the second converter were changed to conform with those previously maintained in the first converter. After recharging, the first converter was again put into service, but with the second converter in the lead and with operating conditions in the two converters exactly the reverse of those obtaining prior to the 72nd hour.

The operation was continued with periodic recharging and reversal of converter sequence and operating conditions.

The product obtained in the above operation had the following average composition:

| | Per cent |
|---|---|
| Tetrahydronaphthalene | 60 |
| Decahydronaphthalene | 30 |
| Naphthalene | 10 |
| Sulfur | Less than 0.01 |

*Example 4*

The system, catalyst and feed stock described in Example 3 above, were used. The rate of addition of hydrogen to the vaporizing system was the same, but no additional hydrogen was introduced between the first and the second converter. Temperatures in the second converter were maintained between 200° and 275° C. Under these conditions a product was obtained with the following approximate average composition:

| | Per cent |
|---|---|
| Decahydronaphthalene | 80 |
| Tetrahydronaphthalene | 10 |
| Naphthalene | 10 |

It will be noted from the above that the process of this invention results in the hydrogenation of crude naphthalenes, i. e. commercial naphthalenes containing appreciable quantities of sulfur to produce tetrahydronaphthalenes, decahydronaphthalenes, or mixtures thereof, while minimizing undersizable side reactions, and this at relatively low pressures and temperatures, so that the process is economic to carry out. In this process, the sulfur impurities in the crude naphthalenes are removed chiefly in the form of nickel sulfide, minimizing, if not completely preventing, the formation of hydrogen sulfide which, if formed, would flow with the gas stream and would reduce the catalyst efficiency and life and possibly also contaminate the reaction product.

Since certain changes may be made without departing from the scope of the invention, it is intended that the above shall be interpreted as illustrative and not in a limiting sense.

What is claimed is:

1. A process for the vapor phase hydrogenation of crude naphthalenes containing sulfur compounds to produce tetrahydro and decahydro naphthalenes which comprises passing the crude naphthalenes in the vapor phase admixed with hydrogen under a pressure of from 2 to 60 atmospheres over a body of hydrogenation catalyst containing a metal from the group consisting of nickel and cobalt in a reaction zone in which the catalyst is disposed in a gradient of ascending activity, said catalyst containing from 1 to 10 mols of metal per liter of reaction zone, the hydrogen being present in amount of at least 4 cubic feet measured at the pressure within the reaction zone and at room temperature per pound of said naphthalenes, maintaining temperature conditions in the reaction zone within the range of from about 170° C. to 340° C. and flowing the naphthalenes and hydrogen over said catalyst so that the approximate time of contact with the catalyst is less than 1 minute.

2. A process as defined in claim 1 in which the catalyst passes through said reaction zone countercurrent to the flow of naphthalene vapor and hydrogen, and a gradient of temperature descending in the direction of flow of the naphthalene is maintained in said reaction zone.

3. A process for the vapor phase hydrogenation of crude naphthalene containing sulfur compounds to produce tetrahydro and decahydro naphthalene which comprises vaporizing the crude naphthalene, contacting the vaporized naphthalene admixed with hydrogen under a pressure of from 2 to 60 atmospheres with a nickel containing hydrogenation catalyst in a reaction zone, said catalyst containing from 1 to 10 mols of nickel per liter of reaction zone and being disposed in said reaction zone in a gradient of ascending activity in the direction of flow of the naphthalene vapor hydrogen mixture, the hydrogen being present in amount of 4 to 15 cubic feet measured at the pressure within the reaction zone and at room temperature per pound of naphthalene, maintaining temperature conditions in the reaction zone within the range of from about 170° to 340° C. and flowing the naphthalene and hydrogen over said catalyst so that the approximate time of contact with the catalyst is in the range of 1 to 30 seconds.

4. A process for the vapor phase hydrogenation of crude naphthalene containing sulfur compounds to produce tetrahydronaphthalene which comprises passing naphthalene vapor admixed with hydrogen under a pressure of from 6 to 30 atmospheres over a nickel containing hydrogenation catalyst in a reaction zone, said catalyst containing from 1 to 10 mols of nickel per liter of reaction zone, the amount of hydrogen employed being from 4 to 15 cubic feet measured at the pressure within the reaction zone and at room temperature per pound of naphthalene, maintaining temperature conditions in the reaction zone within the range of from about 170° to 320° C., flowing the naphthalene vapor hydrogen always upwardly over the body of catalyst so that the catalyst is disposed in a gradient of ascending activity and controlling the rate of flow of naphthalene and hydrogen so that the approximate time of contact with the catalyst is in the range of from 1 to 30 seconds.

5. A process for the vapor phase hydrogenation of crude naphthalene containing sulphur compounds which comprises passing naphthalene vapors admixed with hydrogen under a pressure of from 6 to 30 atmospheres upwardly over a nickel hydrogenation catalyst in a reaction zone, said catalyst moving downwardly countercurrent to the upward flowing stream of naphthalene vapor and hydrogen, and said catalyst containing from 1 to 10 mols of nickel per liter of reaction zone and being disposed in said reaction zone in a gradient of ascending activity in the direction of flow of the naphthalene vapor hydrogen mixture, the amount of hydrogen employed being from 4 to 15 cubic feet measured at the pressure within the reaction zone and at room temperature per pound of naphthalene, maintaining temperature conditions in the inlet end of the reaction zone within the range of from about 250 to 320° C. and from about 170 to 240° C. at the exit end of the reaction zone, and controlling the rate of flow of the naphthalene vapor and hydrogen over said catalyst so that the approximate time of contact with the catalyst is within the range of from 1 to 30 seconds.

6. A process for vapor phase hydrogenation of crude naphthalene containing sulfur compounds to produce decahydronaphthalene which comprises flowing vaporized naphthalene admixed with hydrogen under a pressure of from 15 to 30 atmospheres over a nickel hydrogenation catalyst in the reaction zone, said catalyst containing from 1 to 10 mols of nickel per liter of reaction zone and being disposed in said reaction zone in a gradient of ascending activity in the direction of flow of the naphthalene vapor hydrogen mixture, the hydrogen being present in amount of from 4 to 15 cubic feet measured at the pressure within the reaction zone and at room temperature per pound of naphthalene, maintaining a temperature of from 250 to 300° C. at the inlet end of the reaction zone and a temperature of from 170 to 220° C. at the exit end of the reaction zone, and controlling the rate of flow of the naphthalene vapor and hydrogen over the catalyst so that the approximate time of contact with the catalyst is within the range of from 1 to 30 seconds.

7. A process for vapor phase hydrogenation of crude naphthalene containing sulfur compounds to produce tetrahydronaphthalene which comprises flowing vaporized napthalene admixed with hydrogen under a pressure of from 6 to 15 atmospheres over a nickel hydrogenation catalyst in the reaction zone, said catalyst containing from 1 to 10 mols of nickel per liter of reaction zone and being disposed in said reaction zone in a gradient of ascending activity in the direction of flow of the naphthalene vapor hydrogen mixture, the hydrogen being present in amount of from 5.5 to 11 cubic feet measured at the pressure within the reaction zone and at room temperature per pound of naphthalene, maintaining a temperature of from 250 to 320° C. at the inlet end of the reaction zone and a temperature of from 170 to 240° C. at the exit end of the reaction zone, and controlling the rate of flow of the naphthalene vapor and hydrogen over the catalyst so that the approximate time of contact with the catalyst is within the range of from 1 to 30 seconds.

8. A process for the vapor phase hydrogenation of crude naphthalenes containing sulfur compounds to produce tetrahydro and decahydro naphthalenes which comprises passing the crude naphthalenes in the vapor phase admixed with hydrogen under a pressure of from 2 to 60 atmospheres over a body of catalyst pellets disposed in the reaction zone in a gradient of ascending activity, said catalyst pellets containing nickel deposited on a support in amount of from 1 to 10 mols of nickel per liter of reaction zone, the hydrogen being present in amount of at least 4 cubic feet measured at the pressure within the reaction zone and at room temperature per pound of said naphthalenes, maintaining the temperature conditions in the reaction zone within the range of from about 170 to 340° C. and flowing the naphthalenes and hydrogen through said reaction zone at a rate so that the approximate time of contact with the catalyst is less than 1 minute.

9. A process for the vapor phase hydrogenation of crude naphthalenes containing sulfur compounds to produce tetrahydro and decahydro naphthalenes which comprises passing the crude naphthalenes in the vapor phase admixed with hydrogen under a pressure of from 6 to 30 atmospheres over a body of catalyst pellets in the reaction zone in which the catalyst is disposed in a gradient of ascending activity in the direction of flow of the naphthalene vapor and hydrogen thereover, said catalyst pellets comprising nickel deposited on a siliceous carrier and containing from 2 to 8 mols of nickel per liter of reaction zone, introducing hydrogen at spaced points along the length of the reaction zone to control the temperature within said reaction zone and to maintain temperature conditions therein such that the temperature at the inlet end of the zone is within the range of from 250 to 320° C. and at the exit end of the zone is within the range of from 170 to 240° C., and the temperature progressively decreases from the inlet to the exit end of the zone, the amount of hydrogen thus introduced being such that at least 4 cubic feet of hydrogen is admixed with the naphthalenes measured at the pressure within the reaction zone and at room temperature per pound of said naphthalenes, and flowing the naphthalenes and hydrogen over said catalyst bed at a rate such that the approximate time of contact with the catalyst is in the range of 1 to 30 seconds.

10. A process for the vapor phase hydrogenation of crude naphthalene containing from .02 to .3 percent by weight of sulfur which comprises passing the crude naphthalene in the vapor phase admixed with hydrogen under a pressure of from 6 to 30 atmospheres over a body of catalyst pellets in the reaction zone in which the catalyst is disposed in a gradient of ascending activity in the direction of flow of the naphthalene vapor and hydrogen thereover, said catalyst pellets comprising nickel deposited on a siliceous carrier and containing from 1 to 10 mols of nickel per liter of reaction zone, introducing hydrogen at spaced points along the length of the reaction zone to control the temperature within said reaction zone and to maintain temperature conditions therein such that temperature at the inlet end of the zone is within the range of from 250 to 340° C. and at the exit end of the zone is within the range of from 170 to 240° C., and the temperature progressively decreases from the inlet to the exit end of the zone, the amount of hydrogen thus introduced being such that approximately from 5.5 to 11 cubic feet of hydrogen is admixed with the naphthalene measured at the pressure within the reaction zone and at room temperature per pound of said naphthalene, and flowing the naphthalene and hydrogen over said catalyst bed at a rate so that approximate time of contact with the catalyst is in the range of 1 to 30 seconds.

MARION H. GWYNN.

REFERENCES CITED

The following references are of record in the file of this patent:

UNITED STATES PATENTS

| Number | Name | Date |
| --- | --- | --- |
| 1,896,282 | Broche et al. | Feb. 7, 1933 |
| 2,147,268 | Pyzel | Feb. 14, 1939 |
| 2,174,510 | Gwynn | Oct. 3, 1939 |
| 2,303,075 | Frey | Nov. 24, 1942 |

FOREIGN PATENTS

| Number | Country | Date |
| --- | --- | --- |
| 298,541 | Germany | Jan. 11, 1921 |

OTHER REFERENCES

Lush Jour. Soc. Chem. Ind., vol. 46, 454-6T (1927).